US006831903B2

(12) United States Patent
Kang (10) Patent No.: US 6,831,903 B2
(45) Date of Patent: Dec. 14, 2004

(54) METHOD OF PROVIDING PUBLIC NETWORK SERVICE WHEN CALL MANAGEMENT DEVICE IS IN A DOWN STATE IN PRIVATE WIRELESS NETWORK

(75) Inventor: Min-Seok Kang, Inchon-kwangyokshi (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 818 days.

(21) Appl. No.: 09/821,042

(22) Filed: Mar. 30, 2001

(65) Prior Publication Data

US 2001/0046214 A1 Nov. 29, 2001

(30) Foreign Application Priority Data

May 24, 2000 (KR) ........................................ 2000-28092

(51) Int. Cl.[7] ................................................ H04Q 7/00
(52) U.S. Cl. ...................... 370/328; 370/400; 370/352; 455/433; 455/436
(58) Field of Search ................................ 370/328, 352, 370/349, 353, 471, 354, 356, 395.52, 389, 331, 310.2, 400, 913; 455/433, 436

(56) References Cited

U.S. PATENT DOCUMENTS

| 5,184,347 A | 2/1993 | Farwell et al. |
| 5,243,642 A | 9/1993 | Wise, Jr. et al. |
| 5,303,287 A | 4/1994 | Laborde |
| 5,506,887 A | 4/1996 | Emery et al. |
| 5,557,606 A | 9/1996 | Moon et al. |
| 5,625,866 A | 4/1997 | Lidbrink et al. |
| 5,633,868 A | 5/1997 | Baldwin et al. |
| 5,715,296 A | 2/1998 | Schornack et al. |
| 5,845,211 A | 12/1998 | Roach, Jr. |
| 5,873,033 A | 2/1999 | Hjern et al. |
| 5,890,064 A | 3/1999 | Widergen et al. |
| 5,966,649 A | 10/1999 | Gulliford et al. |
| 5,995,598 A | 11/1999 | Berstis |
| 5,995,831 A * | 11/1999 | Gulliford et al. ......... 455/426.1 |
| 6,034,950 A | 3/2000 | Sauer et al. |
| 6,073,029 A | 6/2000 | Smith et al. |
| 6,097,966 A | 8/2000 | Hanley |
| 6,687,243 B1 * | 2/2004 | Sayers et al. ................ 370/356 |

* cited by examiner

Primary Examiner—Chi Pham
Assistant Examiner—Alexander O. Boakye
(74) Attorney, Agent, or Firm—Robert E. Bushnell, Esq.

(57) ABSTRACT

A method and apparatus of providing a public network service when a call management device is in a down state in a private wireless network is disclosed. The present invention provides the public network service when a call management device is in a down state in wire and wireless composite communication system serving through wire terminal and a wireless terminal by connecting the wireless network to an extended network linked to the public network. The method of providing a public network service having the steps of periodically checking, at the base station controller, a state of the call management device, and performing the wireless public network service when the call management device is in a down state.

29 Claims, 4 Drawing Sheets

METHOD OF PROVIDING PUBLIC NETWORK SERVICE WHEN CALL MANAGEMENT DEVICE IS IN A DOWN STATE IN PRIVATE WIRELESS NETWORK

CLAIM OF PRIORITY

This application makes reference to, incorporates the same herein, and claims all benefits accruing under 35 U.S.C. §119 from an application entitled A Method for Public Call Service When Call Manager Has Down State in a Private Wireless Network earlier filed in the Korean Industrial Property Office on May 24, 2000, and there duly assigned application Ser. No. 2000-28092 by that Office.

BACKGROUND OF THE INVENTION

1. Field of the Invention

The present invention relates to a composite communication system, and more particularly to a method of providing a public network service when a call management device is in a down state in a wire and wireless composite communication system serving through a wire terminal and a wireless terminal by connecting the wireless network to an extended network linked to the public network.

2. Description of the Background Art

The wire voice communication service in an extended area is generally served through a private branch exchange (PBX) or a key-phone system, while the wire data communication service is served through a local area network (LAN) switch and a router using a server and the like. The wireless communication for the extended communication is served by using cordless telephone generation 2 (CT-2), but the handoff function is not supported when the call is linked to a public network. Meanwhile, even if the communication providers are different from each other, the communication service between the wireless terminals is available regardless of a limited area such as the extended area and the service is served with a charge. The wireless communication in the extended area that are limited by a specific area could not be served at present in the field. The cordless telephone generation 2 technique, which served in the Republic of Korea for a while, and global system for mobile communication (GSM) technique of Europe were introduced in part as similar techniques.

However, there is a drawback that the composite communication system allowing the wire and wireless communication is not efficiently provided for in the field. The composite communication system allowing the wire and wireless communication will require that a technique for performing the public network service to complete a call when the call management device of the private wireless network is in a down state.

Exemplars of the art are U.S. Pat. No. 5,995,831 issued to Gulliford et al. for Cellular-Telephone Central Call-Processing System Utilizing Object-Oriented Software In Adjunct Personal Computer, U.S. Pat. No. 5,966,649 issued to Gulliford et al. for Cellular-Telephone Central Call-Processing System Utilizing Object-Oriented Software In Adjunct Personal Computer For Generating Billing Records, U.S. Pat. No. 5,995,598 issued to Berstis for Phone Line LAN, U.S. Pat. No. 5,845,211 issued to Roach, Jr. for Wireless Digital Network, U.S. Pat. No. 6,034,950 issued to Sauer et al. for System Packet-Based Centralized Base Station Controller, U.S. Pat. No. 5,184,347 issued to Farwell et al. for Adaptive Synchronization Arrangement, U.S. Pat. No. 5,243,642 issued to Wise, Jr. et al. for Telephone Call Management Device, U.S. Pat. No. 5,625,866 issued to Lidbrink et al. for Mobile Telecommunication System Having An Auxiliary Routing Arrangement, U.S. Pat. No. 5,557,606 issued to Moon et al. for Routing Of Voice Communication At A Cell Site In A Land Mobile Radio System, U.S. Pat. No. 5,633,868 issued to Baldwin et al. for Virtual Circuit Management In Cellular Telecommunications, U.S. Pat. No. 5,303,287 to Enrique Laborde entitled Integrated Personal/Cellular Communications Systems, U.S. Pat. No. 5,890,064 to Ina Widergen et al. entitled Mobile Telecommunications Network Having Integrated Wireless Office System, U.S. Pat. No. 6,073,029 to Dennis C. Smith entitled Method And System For Providing Wireless Communications To A Subscriber Of A Private Wireline Network; and U.S. Pat. No. 6,097,966 to Donald V. Hanley entitled Wireless Access For Local Exchange Carriers, U.S. Pat. No. 5,506,887 to Emery et al. entitled Personal Communications Service Using Wireline/Wireless Integration, U.S. Pat. No. 5,715,296 to Schornack et al. entitled Concurrent Wireless/Landline Interface Apparatus, U.S. Pat. No. 5,715,296 to Schornack et al. entitled Concurrent Wireless/Landline Interface Apparatus, and U.S. Pat. No. 5,873,033 to Hjern et al. entitled Method And Arrangement For Transfer Between A Cordless Telecommunication System And A Cellular Mobile Telecommunication System.

SUMMARY OF THE INVENTION

It is, therefore, an object of the present invention to provide a method of providing a public network service when a call management device is in a down state in a private wireless network within a wire and wireless composite system availing extended communication.

It is another object to have a highly reliable and efficient wired and wireless communication system.

It is yet another object to have a communication system that will function even when the call management device is in a down state.

It is still yet another object to have a method of determining whether a call management device is in a normal state or abnormal state.

To achieve the above objects, there is provided a method of providing public network service when a call management device is in a down state in a private wireless network. The private wireless network has a base station controller (BSC) for performing a radio link control and a handoff functions, a base station transceiver subsystem (BTS), linked to the base station controller, for constructing a wireless communication path with at least a mobile station which belongs to a cell area of the base station transceiver subsystem and managing radio resources, a private branch exchange (PBX), linked to the base station controller and a local area network (LAN), for performing an origination and termination communication and extension communication and providing a message communication with a call message using an info-link message and voice over Internet protocol (VoIP) function, a call management device for providing private resource management (PRM), program loaded data (PLD) loading functions of a processor which controls wireless calls and services, maintains and repairs the wireless resources, and the base station controller (BSC) resource, for controlling wire and wireless composite functions and supporting a corporate wireless short message service, and for providing a visitor location register (VLR) management function for wireless terminal roaming function between short message service(SMS) web server and the private branch exchange (PBX) and registering corporate wireless subscribers and establishing predetermined functions. The method includes periodically checking, at the base station controller, a state of the call management device, and performing the wireless public network service when the call management device is in a down state.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will now be described with reference to the accompanying drawings. In the following description, the same drawing reference numerals are used for the same elements even in different drawings. Some of the matters defined in the description such as a detailed construction and elements of a circuit are not necessary but are provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
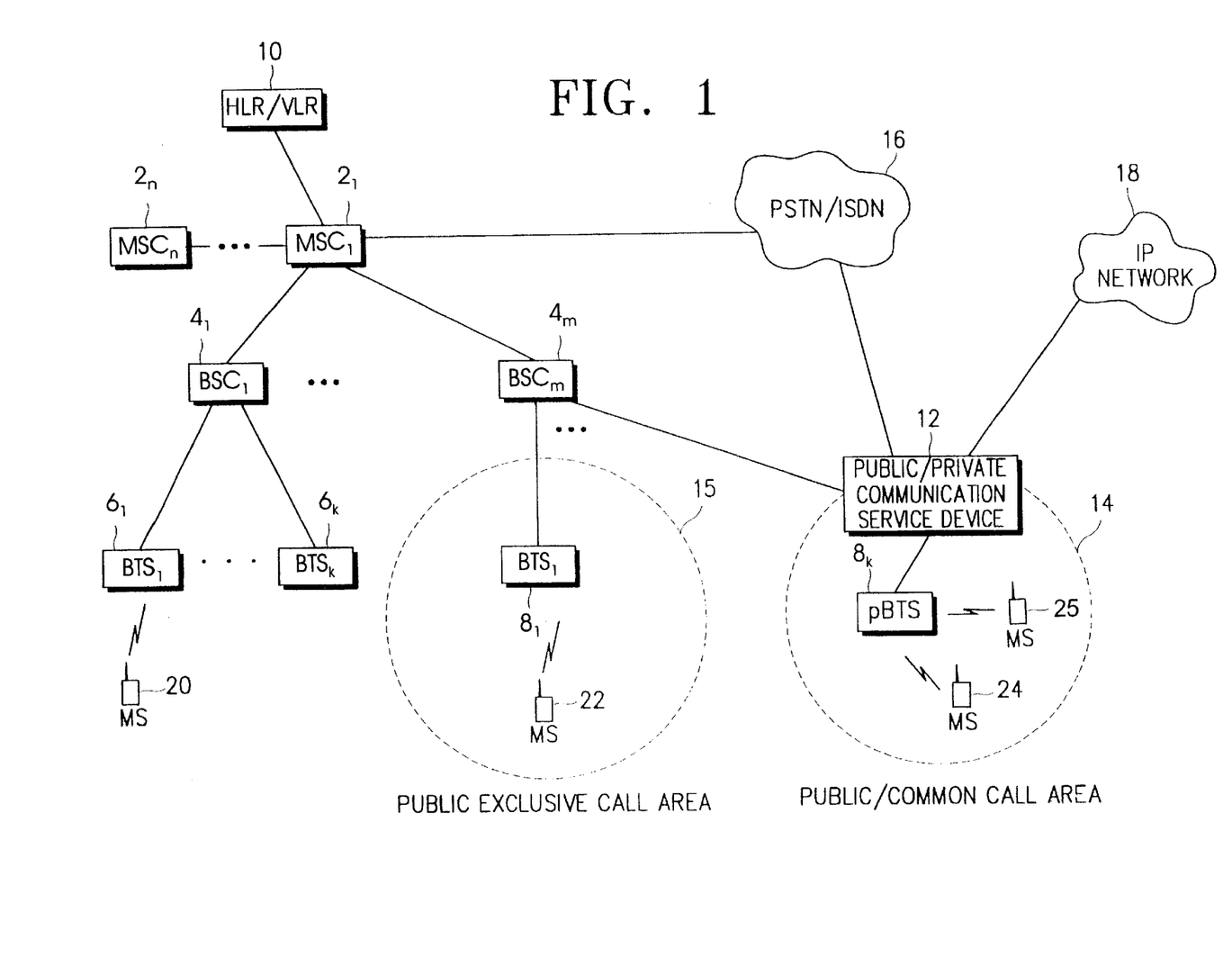
FIG. 1 is a configuration diagram illustrating a concept of the mobile communication service for public and private networks according to a preferred embodiment of the present invention.

Referring to FIG. 1, in the preferred embodiment of the present invention, a public and private common cell area 14 that is a common communication service area for the public and private networks is included and a public and private communication service device 12 is also provided to serve the mobile communication service for public and private networks, simultaneously, as shown in FIG. 1. It is desirable that the public and private common cell area 14 is determined for the benefit of providing the convenience of the communication service for a specific communication user group. For example, if a company has been using a building, the public and private common cell area 14 can be determined as the area belongs to the building. Here, it is desirable that the determination of the public and private common cell area 14 is achieved under the consultation with the mobile communication service provider for the public network in advance. Because, it is to regard the private base station transceiver subsystem (BTS) $8_k$ in the public and private common cell area 14 as a public base station controller in a viewpoint of a public mobile communication system. In the present invention, a private base station transceiver subsystem $8_k$ is called a "pBTS" to distinguish base station transceiver subsystems (BTSs) which belong to the public mobile communication system, i.e., BTSs $6_1$ through $6_k$ and $8_1$ through $8_{k-1}$, and a private base station transceiver subsystem (pBTS) $8_k$ belonging to the public and private common cell area 14 as shown in FIG. 1. The private base station transceiver subsystem $8_k$ constructs the wireless communication path with a plurality of mobile stations 24 belonging to the public and private common cell area 14, performs the managing functions for radio resources, and is connected to a base station controller (BSC) of the public mobile communication system, e.g., base station controller (BSC) $4_m$ shown in FIG. 1, through the public and private communication service device 12. The public and private communication service device 12 is connected to the base station controller (BSC) $4_m$, PSTN and ISDN (public switched telephone network and integrated services digital network) 16, IP (Internet protocol) Network of the public mobile communication system, respectively. The public and private communication service device 12 selectively allows the public and private mobile communication service to a plurality of mobile stations, e.g., the mobile stations 24 as shown in FIG. 1, being in the public and private common cell area 14. If the plurality of mobile stations 24 is registered to the public and private communication service device 12 to affect the private mobile communication service, both the public mobile communication service and the private mobile communication service are provided to the plurality of mobile stations 24. However, the public mobile communication service can only be provided to the plurality of mobile stations 24, if the registration of plurality of mobile stations 24 is not performed or the call management device is in a down state. Also, the public and private communication service device 12 performs the wire communication service with the PSTN and ISDN (public switched telephone network and integrated services digital network) 16 and the IP (Internet protocol) network 18.

Meanwhile, the public mobile communication network is generally called a public land mobile network. The construction of the public mobile communication system thereof includes a plurality of mobile switching centers (MSC) $2_1$ through $2_n$, a plurality of base station controllers (BSCs) $4_1$ through $4_m$, a plurality of base station transceiver subsystem (BTS) $6_1$ through $6_k$ and $8_1$ through $8_k$, a plurality of mobile stations 20 and 22, and home location register and visitor location register (HLR and VLR) 10 as shown in FIG. 1. Each one of the mobile switching centers (MSCs) $2_1$ through $2_n$ is connected to a separate group of base station controllers (BSCs) $4_1$ through $4_m$. Each one of the base station controllers $4_1$ through $4_m$ is connected to a separate group of base station transceiver subsystems (BTS) $6_1$ through $6_k$ and $8_1$ through $8_k$. Especially private base station controller transceiver subsystem $8_k$ is used as one of the plurality of base station transceiver subsystems connected to the base station controllers $4_m$ of the public mobile communication system. The mobile switching centers $2_1$ through $2_n$ control the plurality of base station controllers $4_1$ through $4_m$ which are connected to oneself to be connected to public switch telephone network and integrated services digital network (PSTN and ISDN) or other mobile switching centers within the public mobile communication network. Each one of the base station controllers $4_1$ through $4_m$ performs the radio link and hand off functions, while the plurality of base station transceiver subsystems $6_1$ through $6_k$ and $8_1$ through $8_k$ construct the radio communication path with the mobile stations (MSs) 20, 22 and 24 belong to the cell area and performs the management function of the radio resources. In the home location register and visitor location register (HLR/VLR) 10, the home location register performs a subscriber location register function and a database function for storing the subscriber information, while the visitor location register is a database for temporary storing information of the mobile station (MS) existing in the call area managed by one of the corresponding mobile switching centers (MSCs) $2_1$ through $2_n$. If the mobile station moves to a new cell area managed by other mobile switching centers, the information stored in the corresponding visitor location register may be deleted. In the present invention, the communication service area of the base station transceiver subsystems (BTS) $6_1$ through $6_k$ and $8_1$ through $8_{k-1}$ of the public mobile communication system is called the public exclusive cell area to distinguish with the public and private common cell area 14. As an example, the communication service area of the base station transceiver subsystem $8_1$ between the base station transceiver subsystems $6_1$ through $6_k$ and $8_1$ through $8_{k-1}$ of the public mobile communication system is declared as the exclusively public cell area 15 in FIG. 1. The exclusively public cell area 15 is broader than the public and private common cell area 14, which is determined to provide a convenience of communication service for the specific communication group.

Figure 2:
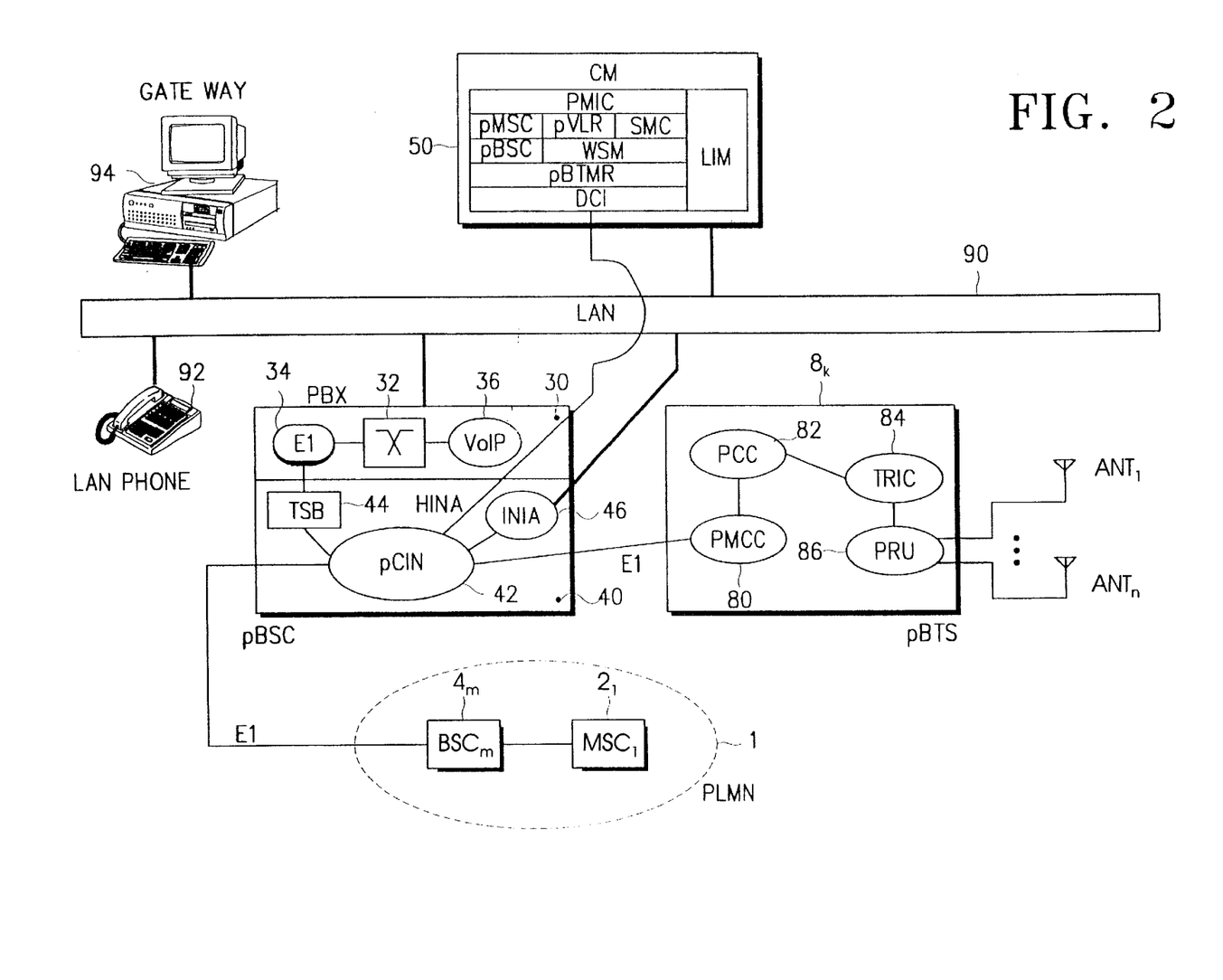
FIG. 2 is a detailed block diagram of the public and private communication service device and a private base station transceiver subsystem (pBTS) of FIG. 1.

Referring to FIG. 2, a private base station controller (pBSC) 40 performs the radio link and handoff functions, which correspond to the base station controller in the public mobile communication system. The private base station controller 40 includes a private communication interconnection network (pCIN) 42, which provides communication paths with the call management device 50, the base station controller $4_m$ of the public land mobile network (PLMN) 1, the private base station transceiver subsystem $8_k$, and data path between each block within the private communication interconnection network 42, respectively. Here, between both the private communication interconnection network 42 and the base station controller $4_m$ of the public land mobile network 1 and between the private communication interconnection network 42 and the private base station transceiver subsystem $8_k$ are linked with E1 line (a high speed communication line according to a European specification), respectively. A transcoder and selector bank (TSB) 44 connected to the private communication interconnection network 42 of the private base station controller (pBSC) 40 is included to provide the wireless communication service for subscribers in the private mobile communication network. The transcoder and selector bank 44 performs 2.408 Mbps and 1.544 Mbps (Millions of bits per second) non-multiplexing transport channel matching function, a vocoder function, a soft handoff function, a call control and voice selection functions, and a power control function. A INIA (Internet protocol network interface board assembly module) 46 connected to the private communication interconnection network 42 of the private base station controller 40 provides the extended wireless data service according to the embodiment of the present invention, and serves for transporting to a local area network 90 the data packet received form the mobile station 24 of the public and private common cell area 14 using point to point protocol (PPP) and transmission control protocol and Internet protocol (TCP/IP). The voice over Internet protocol (VoIP) 36 is placed within the private branch exchange (PBX) 30, the voice over Internet protocol function is served when an Internet protocol (IP) terminal, such as a local area network phone 92 connected between a switch 32 of the private branch exchange 30 and the local area network 90, and a wire terminal (not shown in FIG. 2) connected to the private branch exchange 30 are interworked by the switch 32.

The call management device 50 is connected to both the private base station controller 40 and the local area network 90, the structure and the operation of the call management device 50 will be described in detail as below.

The call management device 50 performs the wireless call control function of the public and private mobile communication service. At this time, the call service for the mobile station of the public mobile network is controlled for bypassing of corresponding messages to the public mobile switching centers. The call management device 50 also performs private resource management (PRM), which indicates a program loaded data (PLD) management, a processor resource management of private base station transceiver subsystem (pBTS) and private base station controller (pBSC), a wireless resource management such as vocoder and channel element in a call management device. Also, the call management device 50 performs the management, maintenance, and repair functions, respectively. The private mobile switching center $2_l$ supervises the resource management for the private base station transceiver subsystem $8_k$, while the call management device 50 just refers to the management. Further, the call management device 50 performs a program of a processor controlling the private base station controller and program loaded data (PLD) function, respectively. But, a base station manager (BSM) serves the loading function for the private base station transceiver subsystem $8_k$. Also, the call management device 50 controls the wire and wireless composite functions, supports a corporate wireless short message service (SMS) function and performs short message service. Further, the call management device 50 supports the registration function of the private mobile communication subscribers and a function of establishing functions, performs visitor location register (VLR) management function for the roaming function of the mobile station subscribed in the private mobile communication network.

As shown in FIG. 2, the private base station transceiver subsystem $8_k$ includes a private base station transceiver subsystem main controller card (PMCC) 80, private base station transceiver subsystem channel card (PCC) 82, transmit and receive interface card (TRIC) 84, and private radio unit (PRU) 86. The detailed description of other elements included in the private base station transceiver subsystem $8_k$ will be omitted in the present invention, since the structure and operation of the elements are similar to the base station transceiver subsystem of the generic public mobile communication system. The private base station transceiver subsystem (pBTS) main controller card (PMCC) 80 in the private base station transceiver subsystem $8_k$ is a block for performing the entire control to the private base station transceiver subsystem $8_k$, treats a signaling message relating the call establishment and system performance, and serves the hardware and software formations and performs the necessary resource allocation. The transmit and receive interface card 84 serves transporting and receiving interface between the private radio unit 86 and the private base station transceiver subsystem main controller card (PCC) 82. The private radio unit 86 is a wireless section and is connected to a plurality of antennas $ANT_l$ through $ANT_n$.

The public and private communication service device 12 provides the wire and wireless service, the IP (Internet Protocol) terminal service, the public and private mobile communication service, the wireless self-function to the mobile station registered in the call management device 50 as well as a composite function related to the wire communication are provided. The service relating the wireless self-functions are an origination call, a termination call, a call transfer, a call forwarding, an extended wireless data service, an extended wireless short message service (SMS) and the like. As an example of the wire and wireless composite function service, there is a function of simultaneously ringing the termination call at both the wire terminal and the mobile station, when the call arrives at the wire terminal.

Providing the mobile communication service and the private mobile communication service means that the system transparently transfers the message corresponding to the public mobile communication network to the public base station controller after analyzing the entire message applied to the public and private communication service device 12, and routes the message corresponding to the private mobile communication network to a module in the call management device 50. That is, the software module performing the path designation role is the base station transceiver subsystem message router (BTMR) 54 of the call management device 50. The base station transceiver subsystem message router 54 analyzes events, messages and designates the path thereof when the events such as the call origination, the call termination, the location registration and the like are generated. The base station transceiver subsystem message router 54 has a router table mapping the path information designated to the corresponding event, and forwards the message to the corresponding module with reference to the router table whenever each message is applied.

Figure 3:
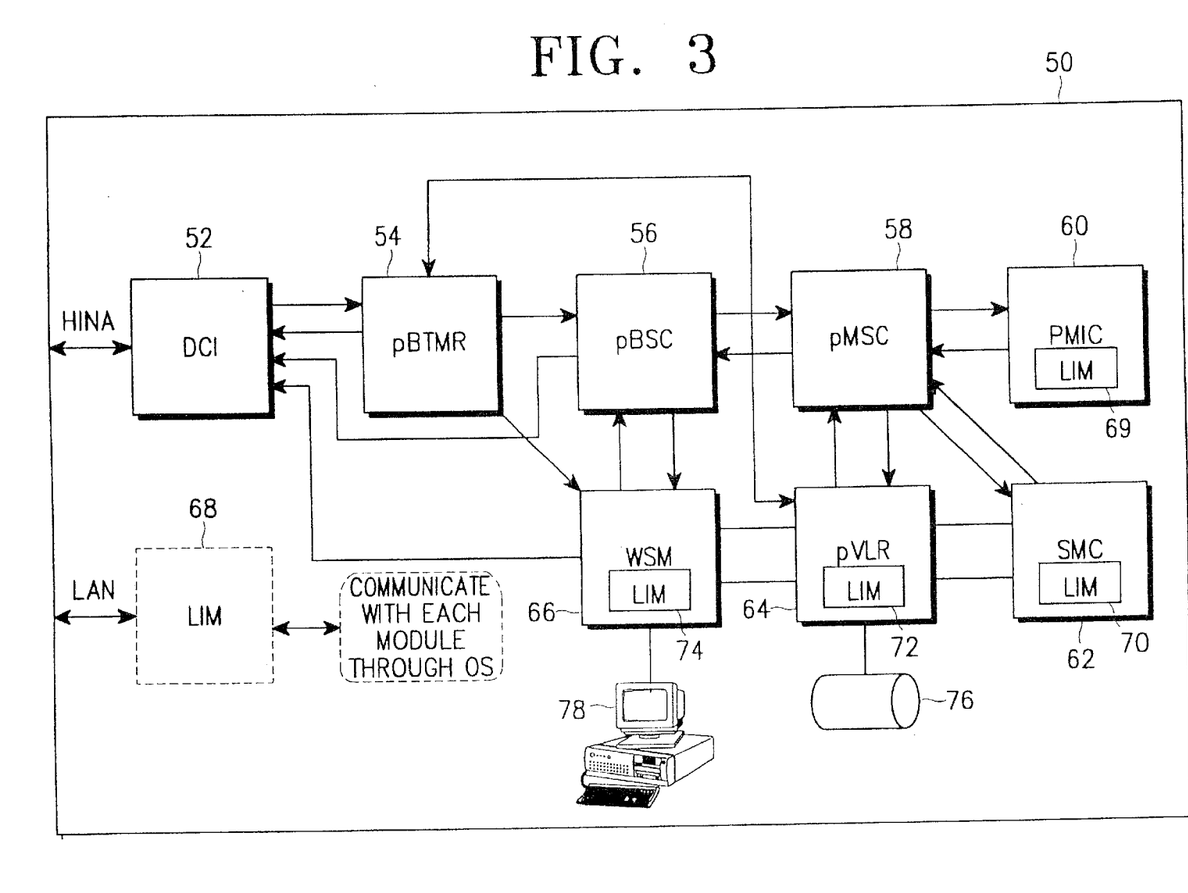
FIG. 3 is a detailed block diagram of a call management device of FIG. 2 according to the preferred embodiment of the present invention.

Referring to FIG. 3, the call management device 50 has software blocks including a data communication interface (DCI) 52, private base station transceiver subsystem message router (pBTMR) 54, private base station controller (pBSC) 56, private mobile switching center (PMSC) 58, PBX (private branch exchange) mobile interface controller (PMIC) 60, short message service controller (SMC) 62, private visitor location register (pVLR) 64, wireless system manager (WSM) 66, LAN (Local Area Network) interface module (LIM) 68. In FIG. 3, the data communication interface 52 is an interface module for communicating the private communication interconnection network 42 of the private base station controller 40 and the call management device 50, and serves inter-process communication (IPC) through high capacity IPC processor assembly (HINA).

The private base station transceiver subsystem message router (pBTMR) 54 is a module for managing the path designation to the entire message, which is treated in the private base station transceiver subsystem $8_k$. That is to say, the private base station transceiver subsystem message router 54 designates both the signaling message path for the (public and private) call origination and termination service of the mobile station and the message for maintaining and repairing service of the private base station transceiver subsystem $8_k$.

The private base station controller 56 is a software module for controlling the private base station controller 40 as shown in FIG. 2 and serves the control of the private base station transceiver subsystem $8_k$.

The private mobile switching center (pMSC) 58 serves a corresponding role to the mobile switching center of the public mobile communication network by equipping between the private base station controller 56 and the PBX (private branch exchange) mobile interface controller (PMIC) 60, as supporting the public and private mobile communication service. Further, the private mobile switching center (pMSC) 58 basically treats the call for the subscriber and analyzes the additional services and treats the related interface for inter-working with the private branch exchange 30. That is, the private mobile switching center 58 analyzes the subscriber service requirements and determines whether the requirement may be treated with the public mobile communication network or the private mobile communication network. At this time, the interface with the private base station controller 56 follows the treatment process of the public mobile communication network and a mutual interface uses the internal inter-process communication (IPC).

The PBX (private branch exchange) mobile interface controller (PMIC) 60 is a software module for controlling the wire and wireless composite function. That is, the private branch exchange mobile interface controller 60 is the software module which treats the call control between the wire terminals connected to the mobile stations being in the public and private common cell area 14, e.g., the plurality of the mobile stations 24 and private branch exchange 30 as shown in FIGS. 1 and 2. But, the private mobile switching center (pMSC) 58 could not directly control the corresponding switch, differing from the public mobile switching center because the switching operation of the public and private communication service device 12 according to the present invention providing the private mobile communication service uses the switch 32 of the private branch exchange 30. Accordingly, in the embodiment of the present invention, the software module of the private branch exchange mobile interface controller 60 is made between the private mobile switching center 58 and the private branch exchange 30, a command for controlling the switch 32 of the private branch exchange 30 by the private branch exchange mobile interface controller 60 is generated. The private branch exchange 30 performs the switching control corresponding to the command.

The short message service controller (SMC) 62 is a software module managing a control function for the short message service and short message service (SMS) web sever function, respectively.

The private visitor location register (pVLR) 64 is a module managing the subscriber's information registered in the private mobile communication service, the location registration information of the private mobile communication subscriber, the information for many kinds of function service. The database 76 for storing the information is connected to the private visitor location register 64.

The wireless system manager (WSM) 66 services the entire maintenance, repair, management of the mobile communication service functions provided from the public and private communication service device 12. A manager console 78 is connected to the wireless system manager 66 to interface with the manager.

The LAN (local area network) interface module (LIM) 68 is a software module serving communication through the local area network 90, and includes local area network interface module (LIM) 69 in the private branch exchange mobile interface controller (PMIC) 60, local area network interface module (LIM) 70 in the short message service controller (SMC) 62, local area network interface module (LIM) 72 in the private visitor location register (pVLR) 64, and local area network interface module (LIM) 74 in the wireless system manager (WSM) 66. Each local area network interface module 69, 70, 72, and 74 manages communication with their associated modules of the private branch exchange mobile interface controller (PMIC) 60, the short message service controller (SMC) 62, the private visitor location register (pVLR) 64, and the wireless system manager (WSM) 66, respectively, through the local area network 90 using an operating system (OS).

Figure 4:
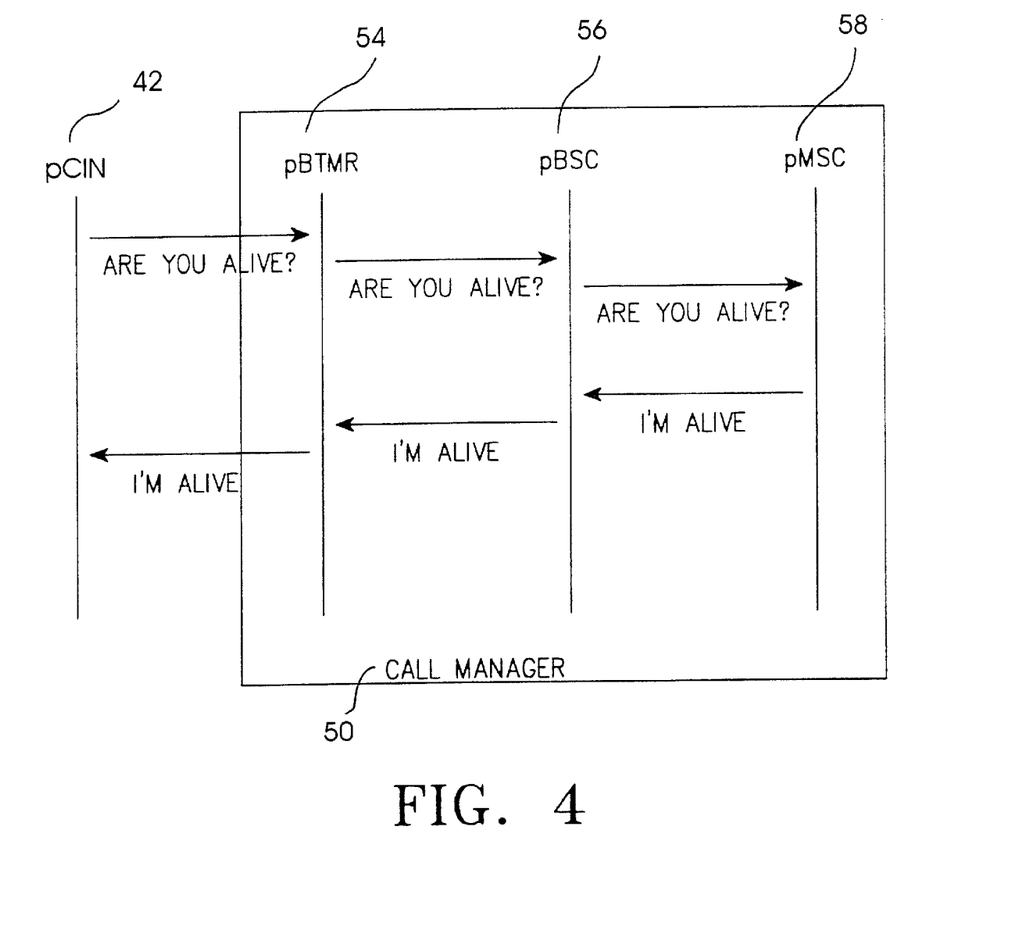
FIG. 4 is a time sequencing chart illustrating the determination operation whether the call management device is on a normal state or abnormal state according to the preferred embodiment of the present invention.

Referring to FIG. 4, the operation of the preferred embodiment of the present invention will be described hereinafter.

The private communication interconnection network 42 forwards the message,e.g., "ARE YOU ALIVE?" for confirming an "ALIVE" state (or normal state) of the call management device 50 to the private base station transceiver subsystem message router (pBTMR) 54 through the data communication interface (DCI) 52 to determine whether the call management device 50 is in a normal state or not. Then, the private base station transceiver subsystem message router (pBTMR) 54 receives the message and transfers to the private base station controller 56, and the private base station controller 56 transfers the message to the private mobile switching center (pMSC) 58. The private mobile switching center 58 sends the message representing "ALIVE" state, e.g., "I'm alive", to the private base station controller 56 when it is in the normal state.

At this time, the private base station controller 56 receives the message representing "ALIVE" and transfers the message to the private base station transceiver subsystem message router 54, and then the private base station transceiver subsystem message router 54 transfers the message to the private communication interconnection network 42 through the data communication interface 52. The private mobile switching center 58 can determine that the call management device 50 is in the normal state when the message of "I'm alive" is received. But, the private communication interconnection network 42 can determine that the call management device 50 is in a down state if the message of "I'm alive" is not received from the call management device 50. The private communication interconnection network 42 checks within the predetermined period whether the call management device 50 is in a down state or not. If the call management device 50 was in a down state as a determination result, the private mobile switching center 58 performs the public network service by transferring the treatment message to the public base station controller $4_m$. The call management device, as one of its functions, intrinsically deals with a message to the public network in the case of a private wireless service, and retransmits a message to the public network in the case of the public network service. Therefore, when the call management device is in a down state, the private wireless service is stopped and only public network service becomes possible. In this case, a treatment message indicates a call setting and release.

The public network service treatment is constructed as following the element order of the mobile station 24, the private base station transceiver subsystem (pBTS) $8_k$, the private communication interconnection network (pCIN) 42 of the private base station controller (pBSC) 40, the transcoder and selector bank (TSB) 44, an E1 interface 34, the switch 32, the transcoder and selector bank 44, the private communication interconnection network 42, the private base station transceiver subsystem $8_k$, a mobile station 25, while the opposite direction path is an example of a communication path when the private communication service is provided.

The path of the public mobile communication service indicates when a terminal in a common cell area transmits a message to a terminal in a public exclusive area. The public mobile communication service is constructed as following the element order of the mobile station (MS) 24, the private base station transceiver subsystem (pBTS) $8_k$, the private communication interconnection network (pCIN) 42 of the private base station controller (pBSC) 40, and the base station controller (BSC) $4_m$, the mobile switching center (MSC) $2_1$, the base station controller (BSC) $4_m$, the base station transceiver subsystem (BTS) $8_1$, the mobile station (MS) 22 of the public land mobile network (PLMN) 1, and the opposite direction path thereof as another example. The opposite direction path being the element order of the mobile station (MS) 24 of the public land mobile network (PLMN) 1, the base station transceiver subsystem (BTS) $8_1$, the base station controller (BSC) $4_m$, the mobile switching center (MSC) $2_l$, the base station controller (BSC) $4_m$, the private communication interconnection network (pCIN) 42 of the private base station controller (pBSC) 40, the private base station transceiver subsystem (pBTS) $8_k$, the mobile station (MS) 24.

However, the private communication interconnection network (pCIN) 42 transfers all the messages (such as a message relating to the call, a state message, a healing message, a test message, and error message, etc.) provided from the private base station transceiver subsystem (pBTS) $8_k$ to the private base station transceiver subsystem message router (pBTMR) 54 through the data communication interface (DCI) 52, since the private mobile switching center (pMSC) 58 determines that the call management device 50 is on the normal state instead of the down state when the message of "I'm alive" is received from the call management device (CM) 50. Then, the private base station transceiver subsystem message router (pBTMR) 54 analyzes the message and changes and transfers the message path through the private communication interconnection network (pCIN) 42 to be transferred to the public network base station controller (BSC) $4_m$, if there is not the message for treating at the call management device 50. But, the private base station transceiver subsystem message router (pBTMR) 54 transfers the message to the internal software module to be performed in the private wireless network, if there is the message for treating at the call management device 50. Stated another way, when a call management device (CM) 50 is "alive" (normal state), a private base station transceiver subsystem message router (pBTMR) 54 transmits a message related to the call management device (CM) 50 among the messages transmitted to the private base station transceiver subsystem message router (pBTMR) 54 to an internal software module, and transmits a message having no relation to the call management device (CM) 50 to the public network base station controller (BSC) $4_m$. The following example further illustrates the internal software module. For instance, referring to FIG. 3, when a signal of the private base station transceiver subsystem message router (pBTMR) 54 is transmitted to a private base station controller (pBSC) 56, then to the private visitor location register (pVLR) 64, and then to the wireless system manager (WSM) 66, in this example the software blocks of the pBSC 56, pVLR 64, and WSM 66 are expressed as the internal software module of the pBTMR 54, since each one of the blocks in FIG. 3 exist as independent internal software modules in the call management device (CM) 50. One of the functions of the pBTMR 54 is to distinguish an internal message from an external message, and to transmit the internal message to the internal software block related to the internal message, when it is an internal message.

As described as above, the present invention provides an advantage that of continuously maintaining the service by performing the public network service even though the call management device was in a down state in the wire and wireless composite communication system which allows the extended wireless service. Accordingly, the communication being served at present can prevent from disconnecting.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method, comprising the steps of:

forwarding a predetermined message by a first unit confirming a normal state of a call management device to a second unit, the first unit providing communication paths with the call management device, the second unit providing the path designation of messages within a communication network, the second unit being within the call management device, the communication network having a wired and wireless communication paths linking a private communication network and a public communication network, the private communication network having subscribers registered to specific service providers, the public communication network not being limited to specific service providers, the call management device performing the wireless call control functions of the public and private communication services;

routing the predetermined message by the second unit to a third unit, the third unit performing a radio link control and handoff functions in the private communication network, the third unit controlling a fourth unit, the fourth unit providing a wireless communication path with a mobile station in a cell area;

transferring the predetermined message by the third unit to a fifth unit, the fifth unit managing a call of a subscriber and determining whether the requirements of the call will be treated with the public communication network or the private communication network;

transferring a second predetermined message in response to the predetermined message by the fifth unit to the first unit when the call management device is in a normal state, the normal state being when the call management device is functioning in its intended manner; and determining by the first unit that the call management device is in a down state when the second predetermined message is not received by the first unit, the down state being when the call management device is not functioning as intended.

2. The method of claim 1, with the first unit being a private communication interconnection network, the second unit being a private base station transceiver subsystem message router, the third unit being a private base station controller, the fourth unit being a private base station transceiver subsystem, and the fifth unit being a private mobile switching center.

3. The method of claim 1, with the step of determining whether the call management device is in a down state further comprising the steps of:

checking for a predetermined period whether the second predetermined message is received; and determining the call management device being in a down state when the second predetermined message is not received by the first unit within the predetermined period.

4. The method of claim 3, further comprising of the step of completing service to the public communication network by the fifth unit transferring a message to the third unit, the message signifying a treatment of a call made by a mobile station.

5. The method of claim 4, further comprising the step of performing a public network service by transferring a treatment message to the third unit when the call management device is in the down state, the public network service being the connection to the public communication network from the private communication network.

6. The method of claim 5, with the first unit transferring all messages provided from the fourth unit to the second unit through a data communication interface when the first unit determines that the call management device is in the normal state.

7. The method of claim 6, further comprising the step of checking the messages and routing the message path by the second unit through the first unit to be transferred to a public network base station controller when there is no treatment message for the call management device.

8. The method of claim 7, further comprising the step of transferring the messages to an internal module for performing a private wireless network when there the message for treating the call management device.

9. The method of claim 8, with the step of transferring the second predetermined message further comprising the steps of:

transferring the second predetermined message by the fifth unit to the third unit;

transferring the second predetermined message by the third unit to the second unit; and transferring the second predetermined message by the second unit to the first unit.

10. The method of claim 1, further comprising the step of completing service to the public communication network by the fifth unit transferring a message to the third unit, the message signifying a treatment of a call made by a mobile station.

11. The method of claim 1, further comprising the step of performing a public network service by transferring a treatment message to the third unit when the call management device is in the down state, the public network service being the connection to the public communication network from the private communication network, the treatment message signifying the down state of the call management device and indicating a call setting and release.

12. The method of claim 11, with the public network service treatment constructed as following the element order of a mobile station, the fourth unit, the first unit of the third unit, a transcoder and selector bank, a communication line interface, a switch, a transcoder and selector bank, the first unit, the fourth unit, and a second mobile station.

13. The method of claim 11, with a public mobile communication service being followed when the call management device is in a normal state, the order of the public mobile communication service being a mobile station, the fourth unit, the first unit, the third unit, a public base station controller, a public mobile switching center, a public base station controller, a public base station transceiver subsystem, a mobile station of a public land mobile network.

14. The method of claim 1, with the first unit transferring all messages provided from the fourth unit to the second unit through a data communication interface when the first unit determines that the call management device is in the normal state.

15. The method of claim 14, further comprising the step of checking the messages and routing the message path by the second unit through the first unit to be transferred to a public network base station controller when the messages are not for treating at the call management device.

16. The method of claim 15, further comprising the step of transferring the messages to an internal software module for performing in a private wireless network when the messages are for treating at the call management device.

17. The method of claim 14, further comprising the steps of:
   transferring from all the messages, a message related to the call management device by the second unit to be performed in a private wireless network; and
   transferring from all the messages, a message having no relation to the call management device to the public network base station controller by the second unit.

18. The method of claim 1, with the step of transferring the second predetermined message further comprising the steps of:
   transferring the second predetermined message by the fifth unit to the third unit;
   transferring the second predetermined message by the third unit to the second unit; and
   transferring the second predetermined message by the second unit to the first unit.

19. The method of claim 1, with the first predetermined message transferring through a data communication interface when transferred from the first unit to the second unit and when the second predetermined message is transferred from the fifth unit to the first unit.

20. The method of claim 19, with the private communication network being connected to a local area network.

21. A method, comprising the steps of:
   periodically checking from a base station controller a state of a call management device, the base station controller performing a radio link and handoff functions in a private wired and wireless communication system, the private wired and wireless communication network having subscribers registered to specific service providers; and
   performing a wireless public network service when the call management device is in a down state, the public wireless network not having subscribers registered to specific service providers, the down state being when the call management device is not functioning according to predetermined specifications.

22. The method of claim 21, further comprising a base station transceiver subsystem linked to the base station controller constructing a wireless communication path with a mobile station in a cell area of the base station transceiver subsystem and managing radio resources, a private branch exchange linked to the base station controller and a local area network for performing an origination and termination and extension communications and providing a message communication with a call message using an info-link message and voice over Internet protocol function, a call management device for providing loading functions of a processor controlling wireless calls and services, maintaining and repairing the wireless resources, and the base station controller resources for controlling wire and wireless composite functions and supporting a corporate wireless short message service, and for providing a visitor location register management function for wireless terminal roaming function between short message service web server and the private branch exchange and registering corporate wireless subscribers and establishing predetermined functions.

23. The method of claim 21, with the check of the state of the call management device being performed by determining whether a confirmation response message of a normal state is received from the call management device, after the base station controller has transferred a message for confirming the normal state to the call management device, the normal state being when the call management device is functioning according to predetermined specifications.

24. The method of claim 23, with the message for confirming the normal state having a first predetermined format.

25. The method of claim 24, with the confirmation response message having a second predetermined format differing from the first predetermined format.

26. A communication system, comprising:
   a base station controller performing a radio link control and handoff functions;
   a base station transceiver subsystem linked to the base station controller constructing a wireless communication path with a mobile station in a cell area of the base station transceiver subsystem and managing radio resources;
   a private branch exchange linked to the base station controller;
   a local area network for performing an origination and termination and extension communications and providing a message communication with a call message using an info-link message and voice over Internet protocol function;
   a call management device providing private resource management, program loaded data loading functions of a processor controlling wireless calls and services, maintaining and repairing the wireless resources, and the base station controller resources for controlling wire and wireless composite functions and supporting a corporate wireless short message service, and for providing a visitor location register management function for wireless terminal roaming function between short message service web server and the private branch exchange and registering corporate wireless subscribers and establishing predetermined functions, the base station periodically checking a state of a call management device, the base station controller performing a radio link and handoff functions in a private wired and wireless communication system, the private wired and wireless communication network having subscribers registered to specific service providers; and
   a mobile switching center performing a wireless public network service when the call management device is in a down state, the public wireless network not having subscribers registered to specific service providers, the down state being when the call management device is not functioning according to predetermined specifications.

27. The communication system of claim 26, with the check of the state of the call management device being performed by determining whether a confirmation response message of a normal state is received from the call management device, after the base station controller has transferred a message for confirming the normal state to the call management device, the normal state being when the call management device is functioning according to predetermined specifications.

28. The communication system of claim 27, with the message for confirming the normal state having a first predetermined format.

29. The communication system of claim 27, with the confirmation response message having a second predetermined format differing from the first predetermined format, the second predetermined format generated the mobile switching center after determining the state of the call management center being normal.

* * * * *